(12) United States Patent
Shimada

(10) Patent No.: US 6,894,957 B1
(45) Date of Patent: May 17, 2005

(54) OPTICAL DISK APPARATUS CAPABLE OF CORRECTING TRACKING ERROR

(75) Inventor: Hiroshi Shimada, Kamakura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 835 days.

(21) Appl. No.: 09/594,082

(22) Filed: Jun. 15, 2000

(30) Foreign Application Priority Data

Jun. 15, 1999 (JP) .......................................... 11-168760

(51) Int. Cl.$^7$ .............................................. G11B 7/00
(52) U.S. Cl. ............................... 369/44.32; 369/44.29; 369/44.35
(58) Field of Search ..................... 369/44.29, 44.35, 369/44.36, 44.34, 53.14, 44.32, 53.26, 47.53; 360/77.04

(56) References Cited

U.S. PATENT DOCUMENTS

| | | | |
|---|---|---|---|
| 4,087,842 A | | 5/1978 | Manly |
| 4,775,966 A | * | 10/1988 | Miura et al. .............. 369/44.32 |
| 5,517,474 A | * | 5/1996 | Takamine ................. 369/44.32 |
| 5,610,885 A | * | 3/1997 | Takahashi ................ 369/44.28 |
| 5,761,165 A | | 6/1998 | Takeda et al. |
| 5,905,705 A | | 5/1999 | Takeda et al. |
| 5,963,517 A | * | 10/1999 | Nakagaki et al. ......... 369/53.14 |
| 6,396,779 B1 | * | 5/2002 | Fujiune et al. ............ 369/44.32 |

FOREIGN PATENT DOCUMENTS

| | | |
|---|---|---|
| JP | 54-146616 | 11/1979 |
| JP | 55-012561 | 1/1980 |
| JP | 60-147936 | 8/1985 |
| JP | 61-276181 | 12/1986 |
| JP | 5-109101 | 4/1993 |
| JP | 6-223502 | 8/1994 |
| JP | 6-259904 | 9/1994 |
| JP | 9-198782 | 7/1997 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

Information is extracted from a track by a pickup during rotation of an optical disk, the output of the pickup is supplied to a head amplifier to generate an information signal including disk record information and a tracking error signal, and a reading-out speed is detected from the information signal from the head amplifier. The frequency component which is near the rotation frequency of the disk within the range of the change in the reading-out speed of the information is extracted from the detected reading-out speed signal, an eccentricity signal showing a position deviation between the center point of the track of the disk and the rotation center point of the disk is output from a band-pass filter, the output of the filter is substantially added to the output of the tracking control circuit, and a tracking actuator is driven and controlled to correct a tracking error.

20 Claims, 7 Drawing Sheets

FIG. 9A ROTATION ANGLE DETECTING SIGNAL

FIG. 9B ECCENTRICITY SIGNAL

FIG. 9C ECCENTRICITY OUTPUT SIGNAL STORED IN STORAGE CIRCUIT

OPTICAL DISK APPARATUS CAPABLE OF CORRECTING TRACKING ERROR

CROSS-REFERENCE TO RELATED APPLICATIONS

This application is based upon and claims the benefit of priority from the prior Japanese Patent Application No. 11-168760, filed Jun. 15, 1999, the entire contents of which are incorporated herein by reference.

BACKGROUND OF THE INVENTION

The present invention relates to an optical disk reproducing apparatus for reproducing information recorded on an optical disk, and in particular to a tracking control for correctly tracing an object track formed on an optical disk such as a compact disk (CD) loaded on an audio CD player apparatus, a CD-ROM disk loaded on a CD-ROM driving apparatus for a computer system, and a DVD disk loaded on a digital versatile disk (DVD) driving device.

Figure 1:
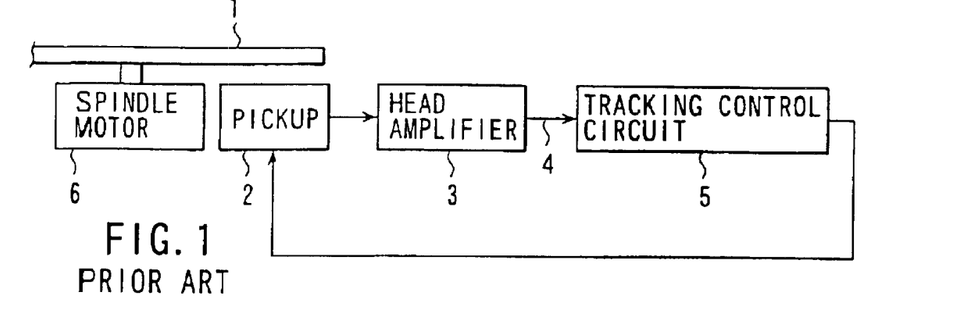
FIG. 1 is a block diagram showing one example of a tracking control of a conventional optical disk reproducing apparatus.

FIG. 1 schematically shows a conventional configuration of a CD-ROM reproducing apparatus.

In FIG. 1, a CD-ROM optical disk 1 used as an information recording medium is loaded on a CD-ROM reproducing apparatus and rotated by a spindle motor 6 for reproducing the information recorded digitally on tracks formed on the disk 1.

An optical pickup 2 is provided as a signal extracting means for reading the information recorded on the disk 1. The optical pickup 2 emits a laser light to the track of the disk 1 and detects change in the intensity or phase of the laser light reflected from or passed through the track of the disk 1, thereby outputting an electric output signal representing the information.

A head amplifier 3 generates a tracking error signal 4 showing a positional deviation between the track and the laser light from the output signal of the optical pickup 2.

A tracking control circuit 5 receives the tracking error signal 4 to perform tracking control wherein a gain compensation and a phase compensation of a tracking servo loop including the tracking control circuit 5 are realized, so that an open loop gain and a phase margin required for the tracking servo loop can be secured. An output of the tracking control circuit 5 is applied to a tracking actuator provided in the pickup 2 via a feedback loop for performing tracking control of the pickup 2.

The tracking actuator adjusts the position of an objective lens provided on the pickup 2 finely in the direction across the track on the disk 1 so that the laser light can trace correctly the track. A motor (not shown) is also provided to move the pickup 2 in the radial direction of the disk 1.

With the feedback loop for the tracking control thus configured, the incident point of the laser light emitted from the pickup 2 is controlled so as to be kept on the track on the disk 1.

Such a tracking control performance is largely affected by an eccentricity of the disk 1. The center point of the track of the disk 1 to be reproduced and the center point of rotation of the spindle motor 6 are not coincident with each other completely, so that the disk 1 is rotated with some deviation from the rotation center or eccentricity by the spindle motor 6.

Here, referring to FIG. 2, the eccentricity of the disk rotation will be explained.

Usually, a track is formed on the disk spirally. In FIG. 2, however, for simple representation, a target track T (a solid line), the preceding and the following tracks T-1 and T+1 (broken lines) are depicted mutually concentrically on the disk, and a geometrical center of the concentric tacks is represented with A point.

When the disk is rotated centering the A point, the eccentricity does not occur, but there actually occurs some deviation in the rotation center of the disk due to mechanical factors such as a manufacturing error of a disk, and a deviation between a rotation center of a spindle motor and that of a disk and the like.

When the actual rotation center of the disk is represented with a point B, the distance between the point A and the point B represents an amount of eccentricity.

When the distance from the point A to the target track T or the radius of the track T is represented with r, the distance between the track T and the rotation center point B of the disk is not made the constant value r. That is, the distance changes by r+d at maximum and by r−d at minimum. This change occurs during one rotation of the disk and the amount of the change becomes (r+d)−(r−d)=2d.

In view of the eccentricity of the disk rotation as mentioned above, the tracking control follows up the change of the distance between the track and the actual rotation center point B so that the laser light must always be maintained on the track.

In a case of a CD-ROM reproducing apparatus, in a standard for a disk, a deviation between the center of the track and a center of a loading hole of the disk, namely the eccentricity caused by the manufacturing error of the disk, is defined as 70 $\mu$m at most. In addition to this eccentricity due to the disk manufacturing error, eccentricity such as a mechanical mounting error between the disk center and the rotation center of the disk when the disk is loaded on the spindle motor may occur, so that a total amount of eccentricity of about 200 $\mu$m may occur in an actual CD-ROM reproducing apparatus.

Also, in the standard, a distance between adjacent tracks on a CD is defined as 1.6 $\mu$m. It has been confirmed experientially that, when the tracking control can control laser light within ±0.1 $\mu$m regarding the center of a track, no problem occurs in reproducing performance.

Accordingly, in order to suppress a tracking error within 0.1 $\mu$m even if the eccentricity of 200 $\mu$m occurs as a displacement in the width direction of the track in the above-mentioned actual reproducing apparatus, an open loop gain of 20 log (200/0.1)=66.0 [dB] is required as a feedback loop for the tracking control.

Figure 3:
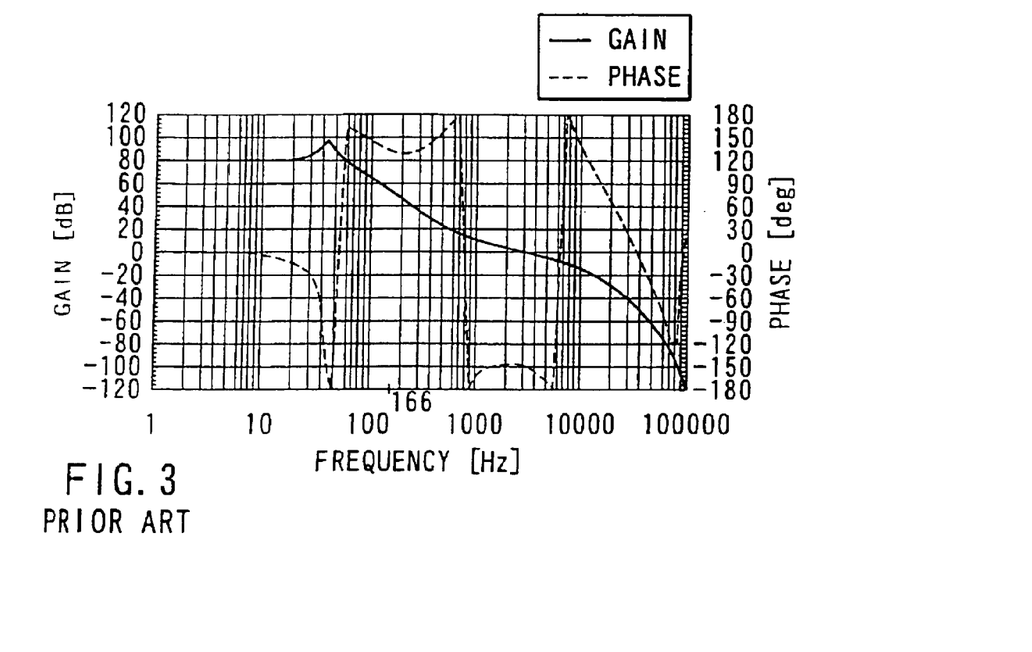
FIG. 3 is a graph showing one example of an open loop characteristic of a tracking control loop of the optical disk reproducing apparatus shown in FIG. 1.

FIG. 3 shows one example of open loop characteristics (frequency to gain, frequency to phase) of a tracking control loop for a CD-ROM reproducing apparatus. In the figure, the abscissa denotes a frequency of a tracking error signal supplied to the tracking control circuit 5, the ordinate in the left side denotes an open loop gain of the tracking control loop and the ordinate in the right side denotes an open loop phase deviation characteristic of the tracking control loop.

In the frequency to gain characteristic shown by a solid line in FIG. 3, the gain is flat below about 10 Hz, the gain becomes a peak in the vicinity of 40 Hz, and the gain gradually decreases above the frequency of 40 Hz.

In the frequency to phase characteristic shown in FIG. 3 with a broken line, the phase is 0 [deg] below about 10 Hz, it is −90 [deg] in the vicinity of 40 Hz, and it once becomes less than −180 [deg] in the vicinity of 50 Hz. However, the phase becomes −180 [deg] or more in a range of 700 Hz to 6000 Hz again in order to secure the phase margin. Around 2000 Hz, for example, the phase becomes −150 [deg] and the phase margin of 30 [deg] with respect to −180 [deg] can be secured.

As the influence of the eccentricity of the disk rotation appears at a frequency range in which the disk rotates. For example, a frequency in the range of 3 to 8 Hz corresponds to a normal reproducing speed in a CD-ROM reproducing apparatus. Even if an eccentricity in this frequency range is included in the tracking error signal, when the open loop gain is 66 [dB] or more, reproduction can be performed normally, even when an eccentricity of 200 µm occurs.

In a conventional tracking control, when the rotation frequency of a disk is about 100 Hz or less, a sufficient open loop gain could have been secured. However, according to a high speed reproducing in a CD-ROM reproducing apparatus, it becomes necessary to reproduce a disk at 10000 rpm, namely a rotation frequency of 166 Hz or more.

However, it becomes difficult to secure an open loop gain in a frequency range of 166 Hz or more in the conventional tracking control while maintaining the phase characteristic or phase margin by only using the conventional tracking control circuit 5 shown in FIG. 1. When it is attempted to secure only the gain sufficiently in a high rotation frequency range, the phase characteristic in other frequency ranges varies largely, so that the phase margin for maintaining a stability of the tracking servo loop can not be secured.

Consequently, with the conventional method, due to a high speed of a disk rotation, it becomes difficult to secure a stable and sufficient open loop gain as the tracking control loop, and the control performance for a disk which is made largely eccentric during rotation of the disk deteriorates. Therefore, the number of rotations for reading-out must be reduced so that a desired reading-out speed can not be realized.

In the tracking control technique for the conventional optical disk reproducing apparatus as mentioned above, there is a drawback that the control performance for a disk which is made largely eccentric during a high speed disk rotation deteriorates so that the desired reading-out speed can not be obtained.

SUMMARY OF THE INVENTION

The present invention is attained for solving the above problem, and an object thereof is to provide an optical disk reproducing apparatus which can detect the eccentric signal easily and can increase a tracking control performance even when the number of rotations of a disk is high and which is made largely eccentric during rotation thereof and which can realize a desired reading-out speed.

An optical disk reproducing apparatus of the present invention comprises a signal extracting section configured to emit a light on a track of an optical disk on which information is recorded during rotation of the disk, to extract the information by receiving the light which is reflected from or passed through the track, and to convert the information to electric signal to be outputted; an information signal generating circuit configured to generate signals including the information which is recorded on the disk and a tracking error signal denoting a relative positional deviation between the light emitted by the signal extracting section and the track regarding a radial direction of the disk; a tracking moving section configured to move an incident position of the emitted light of the signal extracting section in the radial direction of the disk; a tracking control circuit configured to generate a tracking control signal such that the incident position of the emitted light of the signal extracting section is maintained on the track in response to the tracking error signal; an eccentricity signal generating circuit configured to generate an eccentricity signal showing the positional deviation between the center point of the track on the disk and the rotation center point of the disk on the basis of the output of the information generating circuit; and a tracking correcting circuit configured to substantially add the eccentricity signal of the eccentricity signal generating circuit to the output of the tracking control circuit to drive and control the tracking moving section on the basis of an output of the tracking correcting circuit.

With the above arrangement, an optical disk reproducing apparatus can be provided where even when the number of rotation of a disk which is made largely eccentric during rotation of the disk is made high, a tracking control performance can be made high so that a desired reading-out speed can be attained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be explained below with reference to the drawings.

First, the principle of an optical disk reproducing apparatus of the present invention will be explained schematically.

In an optical disk reproducing apparatus of the present invention, taking in consideration an influence on a tracking control due to eccentricity of a disk rotation, not only a tracking error signal but also a signal having an amplitude corresponding to the amount of eccentricity of disk rotation are used to perform a tracking control. Thereby, even when an open loop gain of a tracking control loop is not set to be extremely high, a tracking control performance for a disk which is made largely eccentric during rotation can be made high.

As mentioned above, the signal representing the eccentricity of the disk rotation can be extracted from the change in the reading-out speed of the information read out from the optical disk.

When a disk is correctly loaded on the spindle motor with no eccentricity and is rotated at a constant angular velocity, the reading-out speed from a target track is constant.

The reading-out speed corresponds to a tracing speed or linear speed of the laser light with respect to the target track. Therefore, when the disk is loaded on the spindle motor in an eccentric manner, the distance from the rotation center of the disk to the target track is changed according to the eccentricity and the reading-out speed or linear speed of the laser light on the target track will be changed. Namely, when the distance between the rotation center of the disk and the target track decreases during the rotation of the disk, the reading-out speed becomes slow and, when the distance increases, the reading-out speed becomes high.

This point will be explained in detail with reference to FIG. 2.

Figure 2:
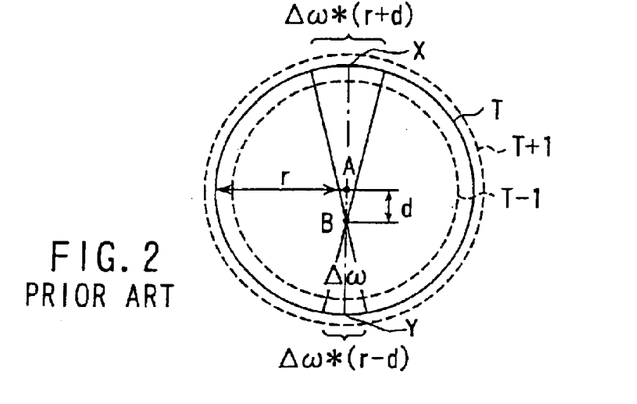
FIG. 2 is a diagram showing one example of an eccentricity of a disk when the disk is loaded on an optical disk reproducing apparatus.

As shown in FIG. 2, the distance from a center point A of a track T from which information is being read out to the rotation center B of the disk is represented as the eccentricity d. When a point X on the target track T becomes at a reading point of the pickup, the distance from the rotation center point B to this point X is r+d where the track point X is spaced from the actual rotation center point B in maximum. While, when a point Y on the target track T moves to the reading point of the pickup, the point Y resides in the minimum distance r−d.

When a spindle motor for rotating and driving a disk is rotated by an angle Δω about the rotation center B in FIG. 2, the incident points X and Y of a laser light emitted from a pickup on the target track T moves along the track T by the distances Δω·(r+d) and Δω·(r−d) in one second, for example, due to the eccentricity.

Accordingly, in a case that the eccentricity exists in the disk rotation, when the disk is rotated at a constant angular velocity, a difference regarding the length of the track T traced by a laser light within a predetermined period of time occurs. Here, when Δω is defined as an angular velocity (constant) of rotation, the length of the track which is traced by a laser light corresponds to an information reading-out speed, namely a linear velocity of the incident light on the target track. The information signal reading-out speed varies by [Δω·(r+d)−Δω·(r−d)]=2Δω·d during one rotation of the disk. This reading-out speed corresponds to a tracing speed or linear speed of the target track by the incident laser light.

A plurality of pits or a pit train is formed on each track on the optical disk as the recorded information. Each pit on the track has the same length and width and the pits are arranged along the track in the same distance with each other. Therefore, if the disk is rotated at a constant angular velocity with no eccentricity, synchronization signals included in the recorded information can be obtained at a constant period. However, if an eccentricity occurs in the disk rotation, the pits at the point X in FIG. 2, for example, are scanned by the laser light rapidly, and the period of the reproduced synchronization signals becomes short. In other words, the intensity of signals obtained in accordance to the recorded pit will be increased in this case which is referred to in this specification that the reading-out speed is high.

On the other hand, when the pit train on the track T is scanned at the point Y in FIG. 2, the pits are scanned more slowly and the period of the reproduced synchronization signals becomes long and the intensity of the reproduced signal will be decreased, thereby the reading-out speed being low.

The change of the reading-out speed occurs every one rotation of the disk and a frequency of the read signals such as the synchronization signal will be changed. The width of the frequency change corresponds to the amount of the eccentricity of the disk rotation. The frequency change is extracted by means of a band-pass filter, for example, a signal representing the degree of eccentricity can be obtained.

As mentioned above, when the change in reading-out speed or reading-out linear speed of the information during one rotation of the disk is measured, a signal denoting the amount of eccentricity can be obtained.

First Embodiment

Figure 4:
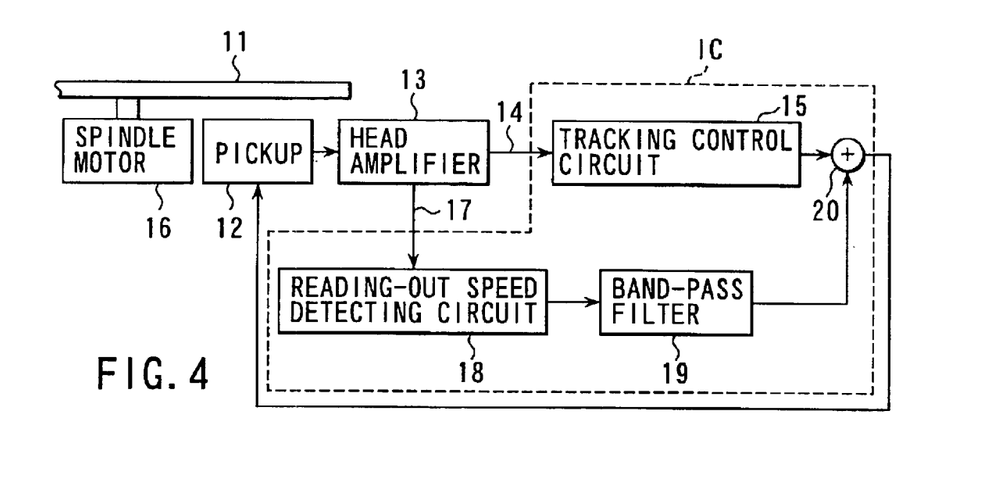
FIG. 4 is a block diagram showing an optical disk reproducing apparatus according to a first embodiment of the present invention.

FIG. 4 shows an optical disk reproducing apparatus according to a first embodiment of the present invention.

In FIG. 4, a disk 11 which is a recording medium for recording information is loaded on a spindle motor 16. The information is digitally recorded on concentric tracks or a spiral track formed on the disk 11.

The spindle motor 16 rotates and drives the disk 11 which is placed on a disk receiving plate, for example, at a predetermined rotation speed.

An optical type pickup 12 is provided as signal extracting means for emitting laser light on the track during rotation of the disk 11, extracting information by receiving light which is reflected from the track or which is passed through the track, and converting the information into electric signals to output the same.

The pickup 12 has a semiconductor laser, a photoelectric conversion element and the like built-in, and it emits laser light on the track on the disk 11 and detects change in the intensity or phase of light which is reflected and returned back from the track on the disk 11 or which is passed through the track, so that information is read out and output to a head amplifier 13 as an electric signal which is, for example, an analog signal of 1 MHz to 40 MHz.

The head amplifier 13 performs amplifying and wave-equalizing processings on the output signal of the pickup 12, and generates a tracking error signal 14 showing a deviation of a relative position between the track and the incident laser light in a radial direction of the disk 11 and an information signal 17 including information which is recorded on the disk 11 as a pit train. Though not shown in FIG. 4, the head amplifier 13 also outputs a focus error signal for adjusting a position of an objective lens provided in the pickup 12 in a direction perpendicular to the surface of the disk 11. This focus adjustment operation and mechanism will be described in detail with respect to the embodiment of FIG. 7.

In the head amplifier 13 shown in FIG. 4, the output signal of the optical type pickup 12 is amplified by a variable gain amplifier (not shown) and is automatically adjusted by an automatic gain control (AGC) loop using a digital servo processor (not shown) so as to have a predetermined constant amplitude suitable for a signal processing in the latter stage. Then, the output of the variable gain amplifier is fed to a binarization circuit (not shown) where the output is converted to a binary signal having one of "H" and "L" levels on the basis of a predetermined slice level. The binary signal is input into a phase synchronizing loop circuit (not shown) and a clock signal synchronized with the binary signal is generated. Then, the clock signal and the binary signal are input into a digital signal processing circuit (not shown) where demodulation, error correction and the like are performed and the information recorded on the optical disk 11 are reproduced. A head amplifier having the above-mentioned configuration and function is usually used in a conventional optical disk reproducing apparatus and a further explanation can be omitted here.

The tracking error signal 14 is supplied to a tracking control circuit 15 from the head amplifier 13 to perform gain compensation and phase compensation for securing an open loop gain and a phase margin necessary for a tracking servo including the tracking control circuit 15 which generates a tracking control signal for controlling the tracking moving means or tracking actuator (described later) such that the incident position of the emitted light on the track from the pickup 12 is maintained on the track.

A moving motor and a tracking actuator (not shown) for moving the pickup 12 in the radial direction of the disk 11 are provided as a tracking moving means as will be described later by referring to FIGS. 7 and 8. The tracking actuator 126 is provided for causing the emitted light through the objective lens 123 of the pickup 12 to trace the center position of the target track by adjusting the incident position of the laser light in the radial direction of the disk 11 in response to the tracking control signal. The moving motor 45 and the moving screw 46 are provided for moving the pickup 12 in the radial direction of the disk 11. These members will be explained more in detail with reference to an embodiment shown in FIG. 7.

Also, the information signal 17 output from the head amplifier 13 is supplied to an eccentricity signal generating circuit for extracting an eccentricity signal representing the amount of change of the information signal reading-out speed during one rotation of the disk 11. The eccentricity signal denotes a positional deviation between the center point of the track on the disk 11 and the rotation center point of the disk 11. In this embodiment, a reading-out speed detecting circuit 18 for receiving the information signal 17 from the head amplifier 13 to detect the information reading-out speed and outputting a reading-out speed signal, and a band-pass filter 19 for receiving the reading-out speed signal from the reading-out speed detecting circuit 18 to extract a component which is near the rotation frequency of the disk 11 within the range of change in information reading-out speed and output the same as the eccentricity signal are employed.

A tracking correcting circuit 20 substantially adds the output (the eccentricity signal of the rotation of the disk 11) of the band-pass filter 19 to the output (the tracking control signal) of the tracking control circuit 15, so that the tracking actuator 126 provided in the pickup 12 is driven and controlled.

Furthermore, a microcomputer which is a system controller for controlling various circuits in the disk reproducing apparatus including the servo control circuits is provided. The system controller will also be explained below with reference to the embodiment own in FIG. 7.

It should be noted that the tracking control circuit 15, the reading-out speed detecting circuit 18, the band-pass filter 19 and the tracking correcting circuit 20 enclosed by a broken line in FIG. 4 may be formed in one semiconductor integrated circuit (IC). Of course, these circuits may be formed as discrete circuits.

As mentioned above, in the optical disk reproducing apparatus according to the first embodiment, the eccentricity signal denoting the amount of eccentricity of the disk rotation which is extracted from the reading-out speed of the disk 11 via the reading-out speed detection circuit 18 and the band-pass circuit 19 during one rotation of the disk 11 is added to the output signal of the tracking control circuit 15 at the tracking correction circuit 20. The added control signal from the tracking correction circuit 20 is applied to the feedback loop of the pickup 12, so that the tracking control circuit 15 can be constituted more simply as compared with the conventional art in which the tracking control circuit should be constituted with a complicated circuitry for compensating the tracking error caused by the eccentricity of the disk.

Moreover, since a large gain of the tracking control circuit near the rotation frequency is not necessary, the constitution of the tracking control circuit 15 may be simplified. Further, the phase margin may also be secured even when the number of rotation of the disk 11 is increased up to 10000, for example, it is made possible to strengthen the control performance of the tracking control, and the laser light emitted from the pickup 12 is controlled such that it is securely maintained on the track on the disk 11.

Here, two specific examples of the reading-out speed detecting circuit 18 will be explained.

Figure 5:
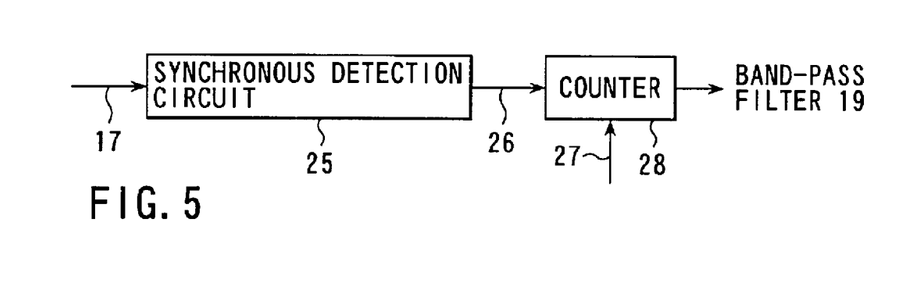
FIG. 5 is a block diagram showing a first specific example of a reading-out speed detecting circuit shown in FIG. 4.

FIG. 5 shows a case where a synchronization signal which is preliminarily recorded on a disk is utilized as a first example of the reading-out speed detecting circuit 18 shown in FIG. 4.

For example, when a CD-ROM which is the disk 11 is reproduced at a normal reproducing speed, the synchronization signals are preliminarily recorded together with information signals on the CD such that information on the CD is reproduced at the frequency of, for example, 1/7350 Hz. As the information is recorded on a track of the CD at a predetermined rate, when the time interval at which the synchronization signals are reproduced is measured during one rotation of a disk at a constant angular velocity, the reading-out speed of the information can be obtained.

Accordingly, as shown in FIG. 5, by inputting information signals 17 from the head amplifier 13 into a synchronous detecting circuit 25 when the pickup 12 traces at least one round of the track, extracting the synchronization signals 26, and counting the time intervals between two adjacent synchronization signals using the clock signals 27 of a fixed frequency by a counter 28, the reading-out speed is represented with the count result. When the reading-out speed of the pickup 12 is increased, the interval between the sequentially detected two synchronization signals is made short so that the count result becomes small. On the contrary, when the reading-out speed is decreased, the interval between the adjacent synchronization signals is made long so that the count result becomes large.

Therefore, the eccentricity signal can be obtained if the count result is represented by digital values and the band-pass filter 19 is a digital filter, a digital eccentricity signal can be obtained directly from the digital band-pass filter 19.

Figure 6:
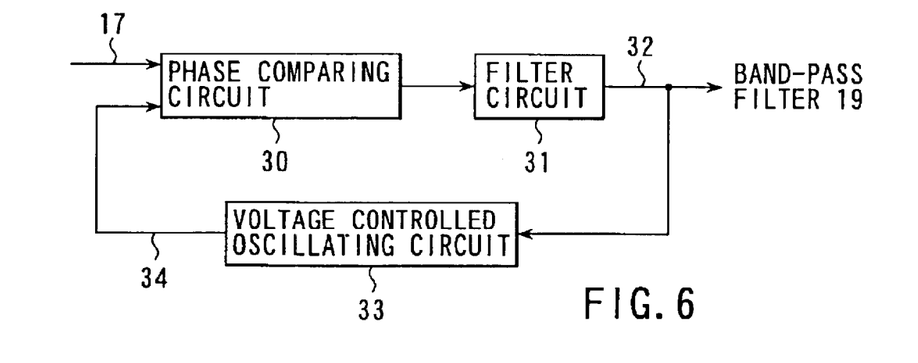
FIG. 6 is a block diagram showing a second specific example of the reading-out speed detecting circuit shown in FIG. 4.

FIG. 6 shows a case where a phase locked loop (PLL) circuit is used as the second specific example of the reading-out speed detecting circuit 18.

In the PLL circuit shown in FIG. 6, when the information signals 17 from the head amplifier 13 are input in a phase comparing circuit 30 as a first input, unnecessary frequency components other than the phase error signal are removed from the output of the phase comparing circuit 30 by the filter circuit 31, and the output of the filter circuit 31 is obtained as a PLL control voltage 32. The PLL control voltage 32 is output input into a voltage controlled oscillating circuit 33, so that PLL clock signal 34 whose frequency changes in response to the PLL control voltage 32 is output. The PLL clock signal 34 is input into the phase comparing circuit 30 as a second input, and the phase comparing circuit 30 compares the phases of the information signal 17 and the PLL clock signal 34 with each other.

According to such a feedback loop, the PLL clock signal 34 which is synchronized with the information signal 17 is generated, and the frequency of the PLL clock signal 34 and the PLL control voltage 32 are changed in proportion to the signal reading-out speed from the CD.

Accordingly, the eccentricity signal can be obtained by inputting the PLL control voltage 32 into the band-pass filter 19 as the reading-out speed signal.

According to the first embodiment, an eccentricity signal can be obtained easily by using a simple circuitry from the read out information signal obtained by the head amplifier 13, and the gain compensation and phase compensation can be realized even if the optical disk 11 is rotated over 10000 rpm.

Second Embodiment

In the above first embodiment, since the amount of eccentricity of the disk rotation can not be measured except for data reading-out time, measurement can not be performed from a state where the tracking control is turned off to a stable state where the tracking control is turned on and information signal can be read out.

A second embodiment where the above point is improved will be explained below.

Figure 7:
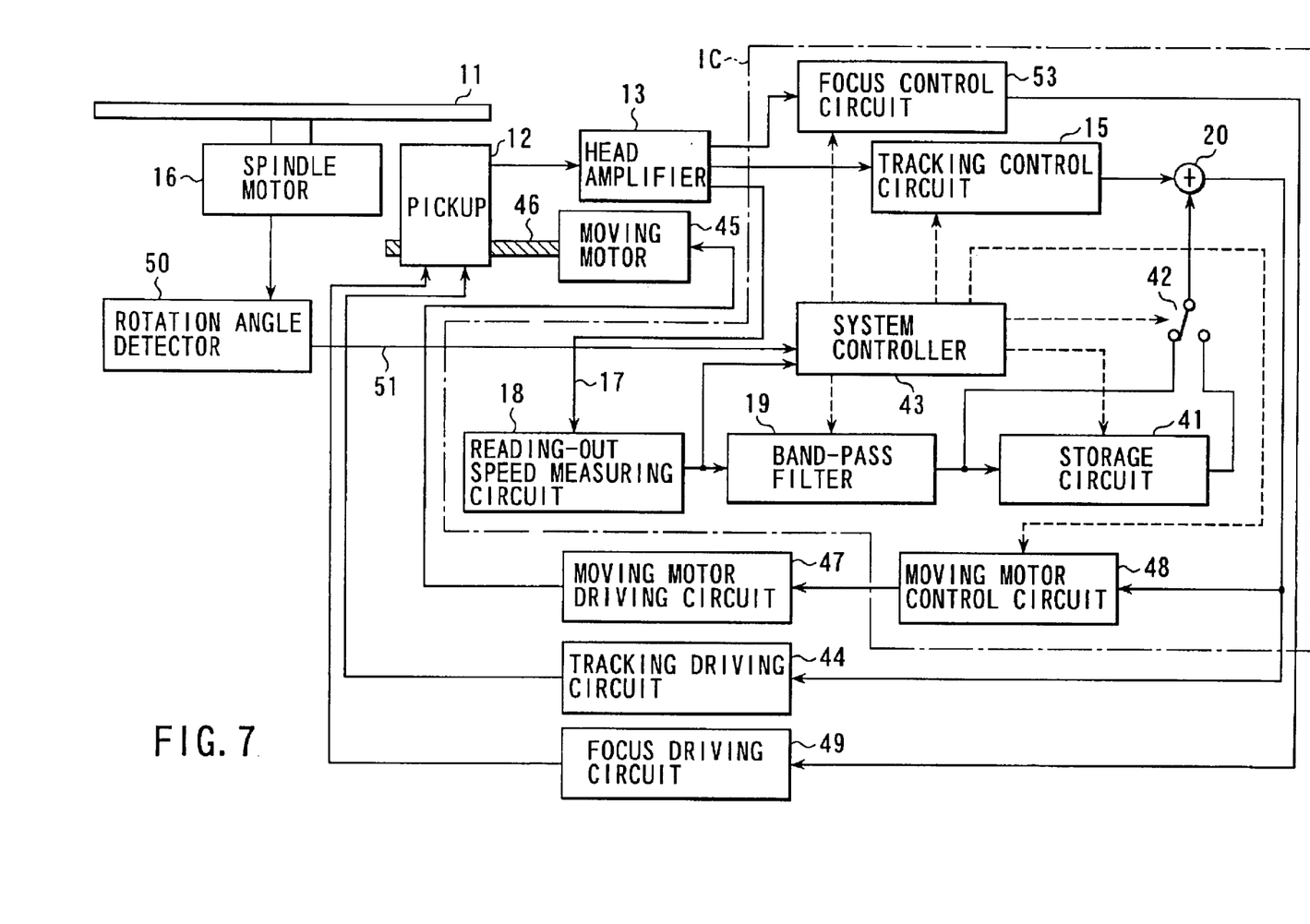
FIG. 7 is a block diagram showing an optical disk reproducing apparatus according to a second embodiment of the invention.

FIG. 7 shows an optical disk reproducing apparatus according to the second embodiment of the invention.

The optical disk reproducing apparatus shown in FIG. 7 is different from the optical disk reproducing apparatus according to the first embodiment described with reference to FIG. 4 in the following two points (1) and (2). In the first point (1), when the tracking control is on, the output of the band-pass filter 19 or the eccentricity signal of the disk rotation is input into a storage circuit 41 for recording a signal including information representing the eccentricity signal of the disk rotation or the change in the reading-out speed during at least one rotation of the disk 11 is stored in the storage circuit 41.

In the second point (2), when the output signal of the band-pass filter 19 is stored in the storage circuit 41, and when the tracking control is either on or off state, one of the output of the band-pass filter 19 and the output of the storage circuit 41 is selected and fed to the tracking correcting circuit 20. However, though omitted in FIG. 4, a system controller 43 for controlling the entire system, a tracking driving circuit 44 for controlling the position of an objective lens in the pickup 12 by the tracking actuator 126 on the basis of the output of the correcting circuit 20, a pickup moving motor 45 for moving the pickup 12 in the radial direction of the disk 11 so as to cross the track through a moving screw 46, a moving motor driving circuit 47 for driving the moving motor 45, a moving motor control circuit 48 for controlling the moving motor driving circuit 47, a focus driving circuit 49 for controlling the focus of the objective lens and a focus controlling circuit 53 for controlling the focus driving circuit 49 are shown in FIG. 7.

For performing the focus control of the objective lens 123, the focus control circuit 53 receives an output of the head amplifier 13 to control the coil 127 acting as a focusing actuator via the focus driving circuit 49. When the coil 127 is driven, the objective lens 123 is driven in the direction perpendicular to the surface of the optical disk 11, so that the laser light is focused on the surface of the track.

Figure 8:
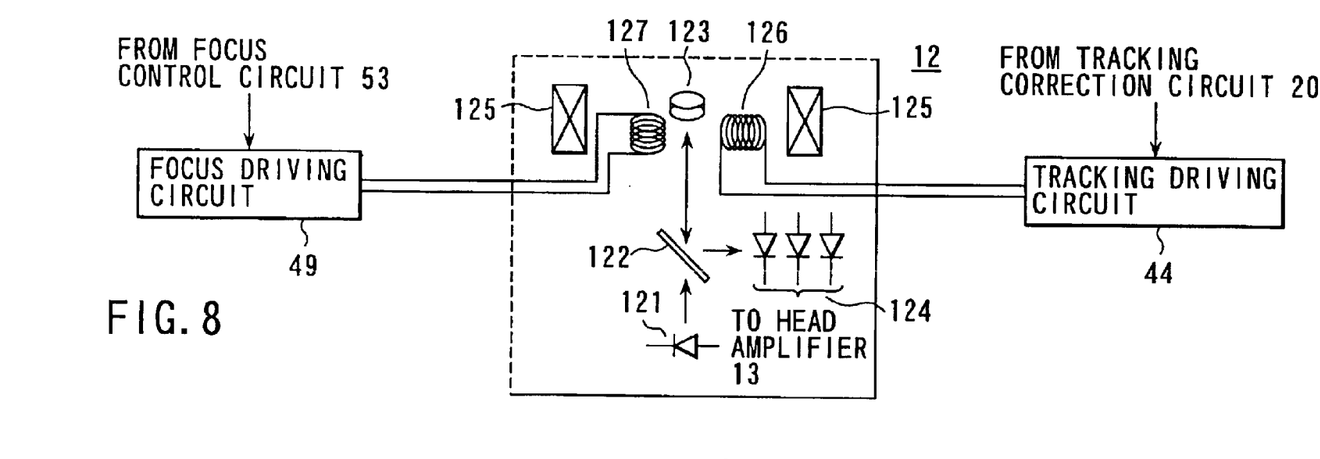
FIG. 8 is a diagram showing a schematic configuration of a pickup shown in FIG. 7.

FIG. 8 is a diagram schematically showing one example of an inner configuration of the pickup 12. In FIG. 8, laser light emitted from a laser diode 121 passes through a half mirror 122 to be irradiated on the disk 11 from an objective lens 123. The laser light which is reflected from the track on the disk 11 is incident on the objective lens 123 and the half mirror 122 again, and it is incident on a light detecting device 124 comprising photodiodes after being reflected by the half mirror 122, so that reproduced information corresponding to pits formed on the track is fed to the head amplifier 13.

The objective lens 123 is provided in a magnetic circuit comprising permanent magnets 125 and electromagnetic coils 126 and 127. One electromagnetic coil 126 functions as a tracking actuator for moving the objective lens 123 across the track and it is driven by the output signal of the tracking driving circuit 44. The other electromagnetic coil 127 functions as a focusing actuator for moving the objective lens 123 relative to the disk 11, and it is driven by the output signal of the focusing driving circuit 49 controlled by the focus control circuit 53.

In order to store the signal representing an amount of eccentricity corresponding to one rotation of the disk, the information representing one rotation of the disk must be obtained. However, while a disk such as a CD on which information is recorded at a constant linear velocity is being reproduced, the information corresponding to one rotation of the disk can not be obtained from the head amplifier 13.

On the other hand, in a CD-ROM reproducing apparatus, when the apparatus reads out information especially at a high speed, a brushless motor is used as the spindle motor 16 for rotating and driving the disk 11, and the timing of the rotational drive of the motor is detected by a mechanical angle sensor such as a hole sensor or the like, which is attached to the motor.

The optical disk reproducing apparatus shown in FIG. 7 is an example where the rotation angle of the disk is detected by such an angle sensor as mentioned above, and a rotation angle detector 50 for generating a timing for storing the information of the eccentricity amount corresponding to one rotation of the disk in the storage circuit 41 is employed.

The rotation angle detector 50 includes an angle sensor, and it captures a signal representing the rotation angle of the spindle motor 16 by waveform shaping the output from the angle sensor. The rotation angle detecting signal 51 thus captured is a signal outputting a plurality of pulses emitted for respective constant angle rotations during one rotation of the disk 11 and it is fed to the system controller 43.

The storage circuit 41 stores the output (the eccentricity signal of disk rotation) of band-pass filter 19 for each pulse of the rotation angle detecting signal 51 (for each constant rotation angle) under control of the system controller 43. Also, when the eccentricity signal which is stored is read out, it can be output in synchronism with rotation of the disk 11 by outputting the eccentricity signal for each pulse of the rotation angle detecting signal 51 (for each constant rotation angle) under control of the system controller 43.

Figure 9A:
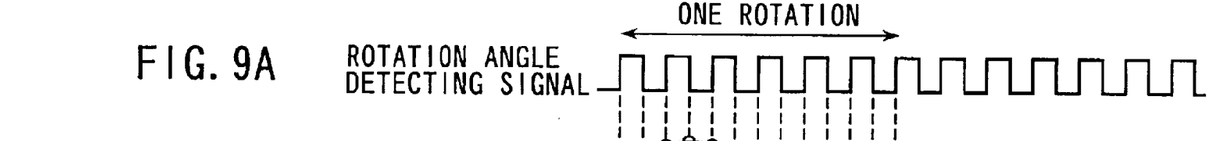
FIGS. 9A to 9C are diagrams showing one example of a timing relationship regarding portions of operation signal waveforms in the optical disk reproducing apparatus shown in FIG. 7.
Figure 9B:
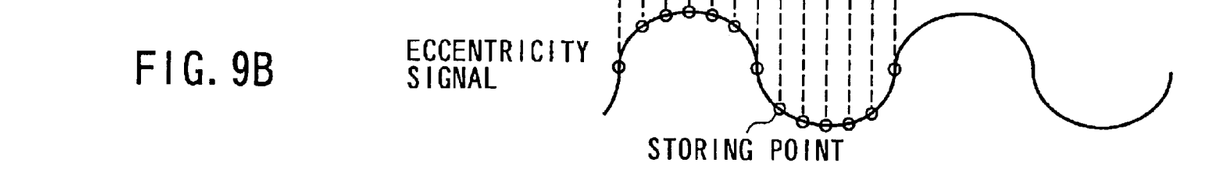
Figure 9C:
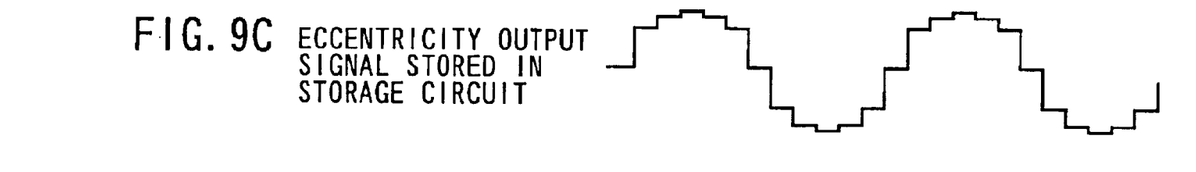

FIGS. 9A to 9C show one example of a timing relationship about a portion of an operation wave in the optical disk reproducing apparatus shown in FIG. 7.

Here, as shown in FIG. 9A, six pulses (namely, for each 60° rotation) are output as the rotation angle detecting signal 51 during one rotation of the disk 11. For example, the pulses are generated in response to the rising edge and the falling edge of the rotation angle detection signal 51. The output (the eccentricity signal of the disk rotation) of the band-pass filter 19 is increased and decreased once during one rotation of the disk 11.

The storage circuit 41 stores the digital signal representing the amount of the eccentricity for each rising edge of the rotation angle detecting signal 51 and for each falling edge thereof. As shown in FIG. 9B, assuming that the edge of the rotation angle detecting signal 51 is generated 12 times at equal intervals during one rotation of the disk 11, the storage circuit 41 stores 12 pieces of sample information therein. Even when the 12 pieces of sample information are output, each is output for each edge of the rotation angle detecting signal 51, as shown in FIG. 9C.

Incidentally, the tracking control circuit 15, the reading-out speed detecting circuit 18, the band-pass filter 19, the tracking correction circuit 20, the storage circuit 41, the selecting circuit 42, the moving motor control circuit 48, the focus control circuit 53 and the system controller 43 which are surrounded with a broken line in FIG. 7 may be formed together in a semiconductor integrated circuit IC. Of course, these circuits may be made as discrete circuits.

Operation of the embodiment shown in FIG. 7 will be explained below with reference to FIGS. 9A to 9C, FIG. 10 and FIG. 11. In the circuit shown in FIG. 7, it is possible to conduct two operations, namely, a case (a first set example) where one of the output signal of the reading-out speed measuring circuit 18 showing the degree of eccentricity and the output signal of the band-pass filter 19 is selected by the selecting circuit 42 and it is combined with the tracking control signal from the tracking control circuit 15 in the tracking correction circuit 20 and a case (a second set example) that the output of the band-pass filter 19 is stored in the storage circuit 41, one of the signal read out from the storage circuit 41 and the output signal of the band-pass filter 19 is selected by the selecting circuit 42, and the selected signal is combined with the tracking signal from the tracking control circuit 15 in the correction circuit 20.

Figure 10:
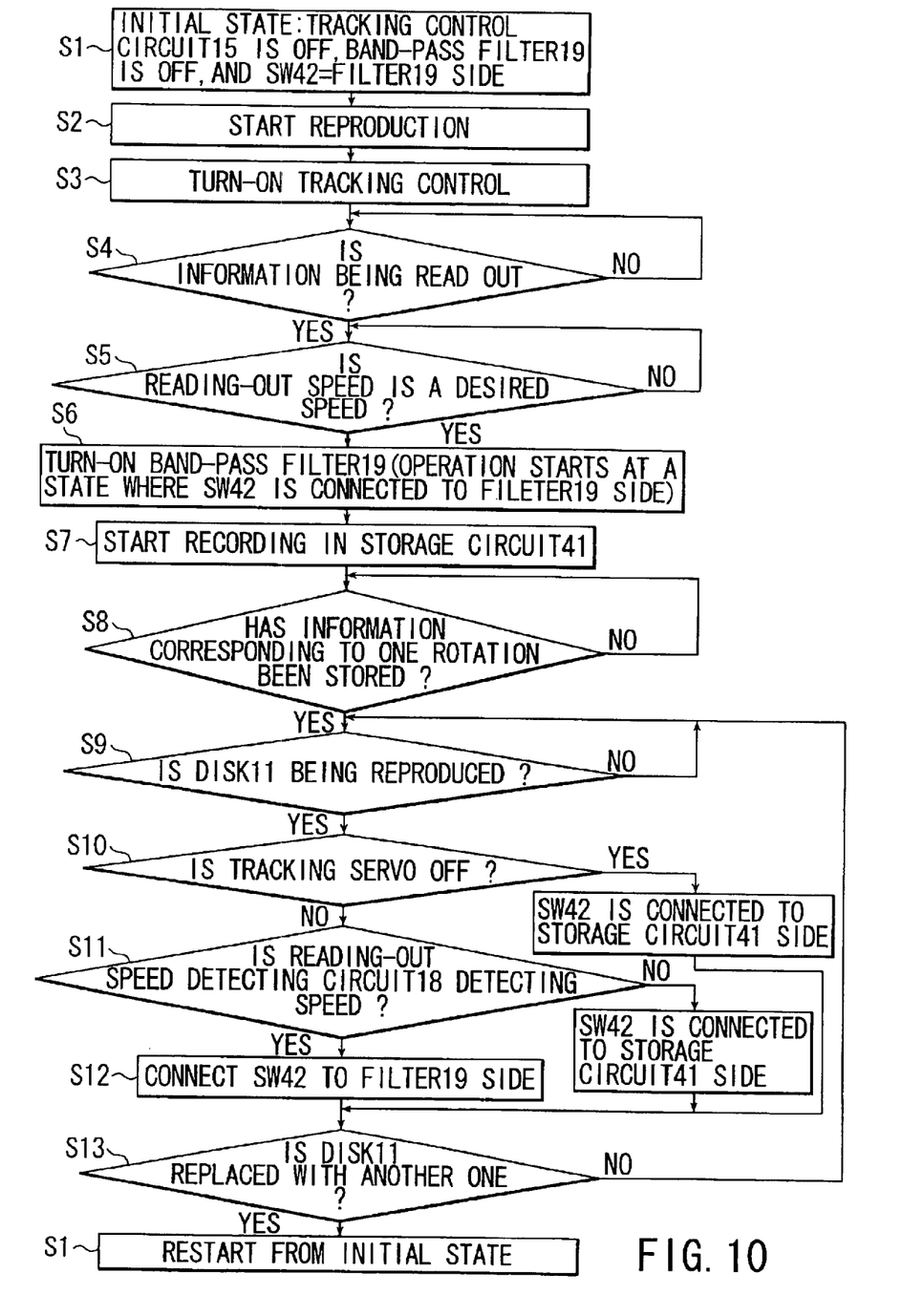
FIG. 10 is a flowchart showing an operation in a first set mode of the apparatus shown in FIG. 7.

Here, the selecting operation performed by the selecting circuit 42 will be explained in detail as the operation of the system controller 43 with reference to flowcharts shown in FIGS. 10 and 11.

First, the first set example will be explained with reference to FIG. 10. This first set example starts with a state where the reading-out speed signal representing an amount of eccentricity is not stored in the storage circuit 41.

In step S1 which is an initial state, the tracking control circuit 15 is off, the band-pass filter 19 is off, and the selecting circuit 42 is connected to the band-pass filter 19 side.

From this state, the system shown in FIG. 7 is set to a reproducing start state by the system controller 43 in step S2, and the system controller 43 detects that the disk 11 is being rotated and driven by the spindle motor 16. In this state, the system controller 43 checks the state of the input side of the head amplifier 13, and the focusing driving circuit 49 urges the focusing actuator 127 to adjust the same to a normal focusing state as needed.

In step S3, the tracking control is set to an on state, the head amplifier 13 outputs information signal 17, and the reading-out speed detecting circuit 18 detects a reading-out speed.

From this state, when information is being read out normally, the control proceeds to the next step S5.

In step S5, the output signal of the reading-out detecting circuit 18 is checked and, when the rotation of the disk 11 is made stable and a desired reading-out speed can be detected, the control proceeds to step S6 where the band-pass filter 19 is set to on. At this time, the selecting circuit 42 is connected to the band-pass filter 19 side.

In this state, the system controller 43 receives the rotation angle detecting signal 51 shown in FIG. 9A from the rotation angle detector 50, and based upon this signal, the eccentricity signal for one rotation of the disk 11 shown in FIG. 9B is stored in the storage circuit 41 in step S7.

At this time, the output of the band-pass filter 19 is fed to the correcting circuit 20, and it is mixed with the output of the tracking control circuit 15 to be sent to the tracking driving circuit 44, so that a tracking control is performed on the pickup 12.

The system controller 43 detects one rotation of the disk 11 by the rotation angle detecting signal 51, and, after the one rotation signal is stored in step S8, the control proceeds to S9.

In step S9, the system controller 43 checks the state of the reproduced signal 17 again, to detect whether or not the disk 11 is being reproduced. If YES, the control proceeds to the next step S10 where a check is made about whether the tracking servo is off or on.

When the tracking servo is in the off state, the selecting circuit 42 is switched to the storage circuit 41 side, and then a tracking operation of the disk 11 is performed by a synthesized signal of the output of the storage circuit 41 and the output of the tracking control circuit 15. Then, the control proceeds to step S13.

On the other hand, in step S10, when it is detected that the tracking servo is not off, the control proceeds to step S11.

In step S11, it is checked whether the reading-out speed detecting circuit 18 detects the reading-out speed of the information signal. If the fact that no reading-out speed signal is detected is recognized from the output of the circuit 18, the switching circuit 42 is changed over to the storage circuit 41 side, and the tracking operation is performed by a synthesized signal of the output of the storage signal 41 and the output of the tracking control circuit 15. Thereafter, the process proceeds to step S13.

In step S11, where it is detected that the reading-out speed detection circuit 18 is detecting the reading-out speed, the control proceeds to step S12 where the switching circuit 42 is switched to the side of the band-pass filter 19 to perform the tracking operation by the synthesized signal of the output signal of the band-pass filter 19 and the output of the tracking control circuit 15. Then the operation proceeds to step S13.

In step S13, it is checked that the disk being reproduced is changed or not. While no change in disk is performed, the operation returns to step S9 so as to correspond to the state of the information reproduction. Namely, the switching circuit 42 is switched in accordance with the states of the tracking servo operation and the output condition of the reading-out speed detection circuit 18. This operation of feedback loop is continued until a new disk is loaded in the reproducing apparatus.

When it is detected in step S13 that a new disk is loaded, the operation returns to the initial state of step S1 and restart is performed.

Thus, since the amount of eccentricity is determined on the basis of a manufacturing error of the disk 11 itself and a mounting error occurring when the disk 11 is mounted to the spindle motor 16, the amount of eccentricity does not change in general once the disk 11 is mounted to the spindle motor 16. The influence on the tracking control due to the eccentricity is repeated for each one rotation of the disk 11. Therefore, by storing the amount of eccentricity corresponding to one rotation of the disk, even when the reading-out speed can not be detected, the amount of eccentricity which is stored in the storage circuit 41 can compensate for such a failure in detection. Accordingly, once the amount of eccentricity corresponding to one rotation is stored, the tracking control can be performed using the amount of eccentricity which is stored thereafter.

The second set example will be explained below with reference to FIG. 11. In a flowchart shown in FIG. 11, steps S21 to S28 are the same operations as those in step S1 to S8 shown in FIG. 10, and therefore explanation thereof will be omitted.

Figure 11:
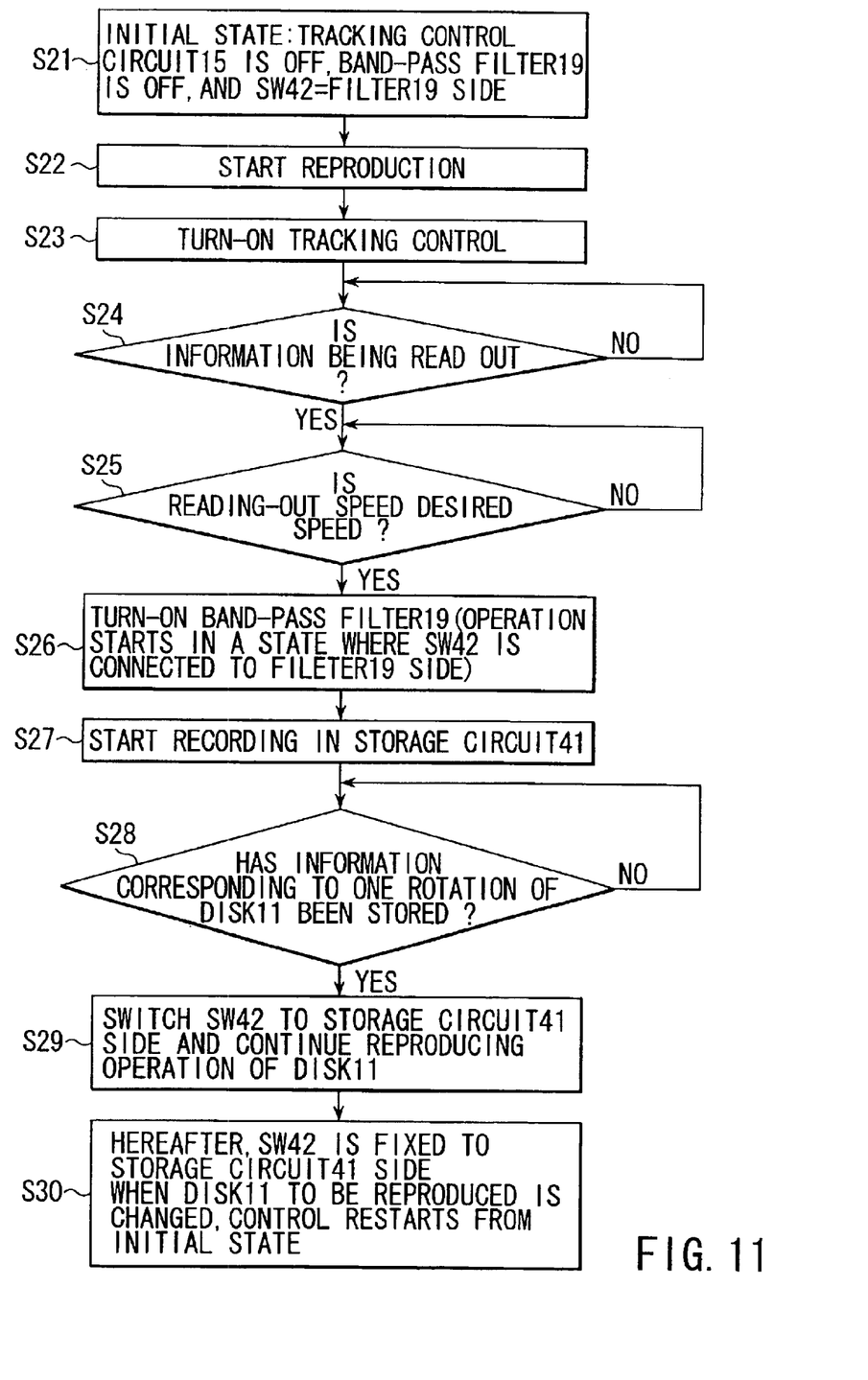
FIG. 11 is a flowchart showing an operation in a second set mode of the apparatus shown in FIG. 7.

In step S28 shown in FIG. 11, when the eccentricity signal corresponding to one rotation of the disk 11 is stored in the storage circuit 41, the selecting circuit 42 is switched to the storage circuit 41 side in the step S29, so that the reproducing operation of the disk 11 is continued with the eccentricity signal from the storage circuit 41.

Then, the control proceeds to step S30, where the selecting circuit 42 is fixed to the storage circuit 41 side, this switched state is continued until the disk is replaced with a new one for reproducing, and the control is restarted from the initial state when the new disk is set.

Incidentally, in each of the above set examples, the operation where the amount of eccentricity corresponding to at least one rotation of the disk 11 is stored in the storage circuit 41 is preferably performed such that information about the amount of eccentricity in a stable state of rotation after rotation of the disk 11 starts is stored.

In this manner, as in the first embodiment, when the amount of eccentricity corresponding to one rotation of a disk is stored in advance, the amount of eccentricity which is stored can compensate for failure in detection of the reading-out speed. Alternatively, after the amount of eccentricity corresponding to one rotation of a disk has been stored, the tracking control can be corrected using the stored amount of eccentricity.

Modified Embodiment of the First Embodiment

Figure 12:
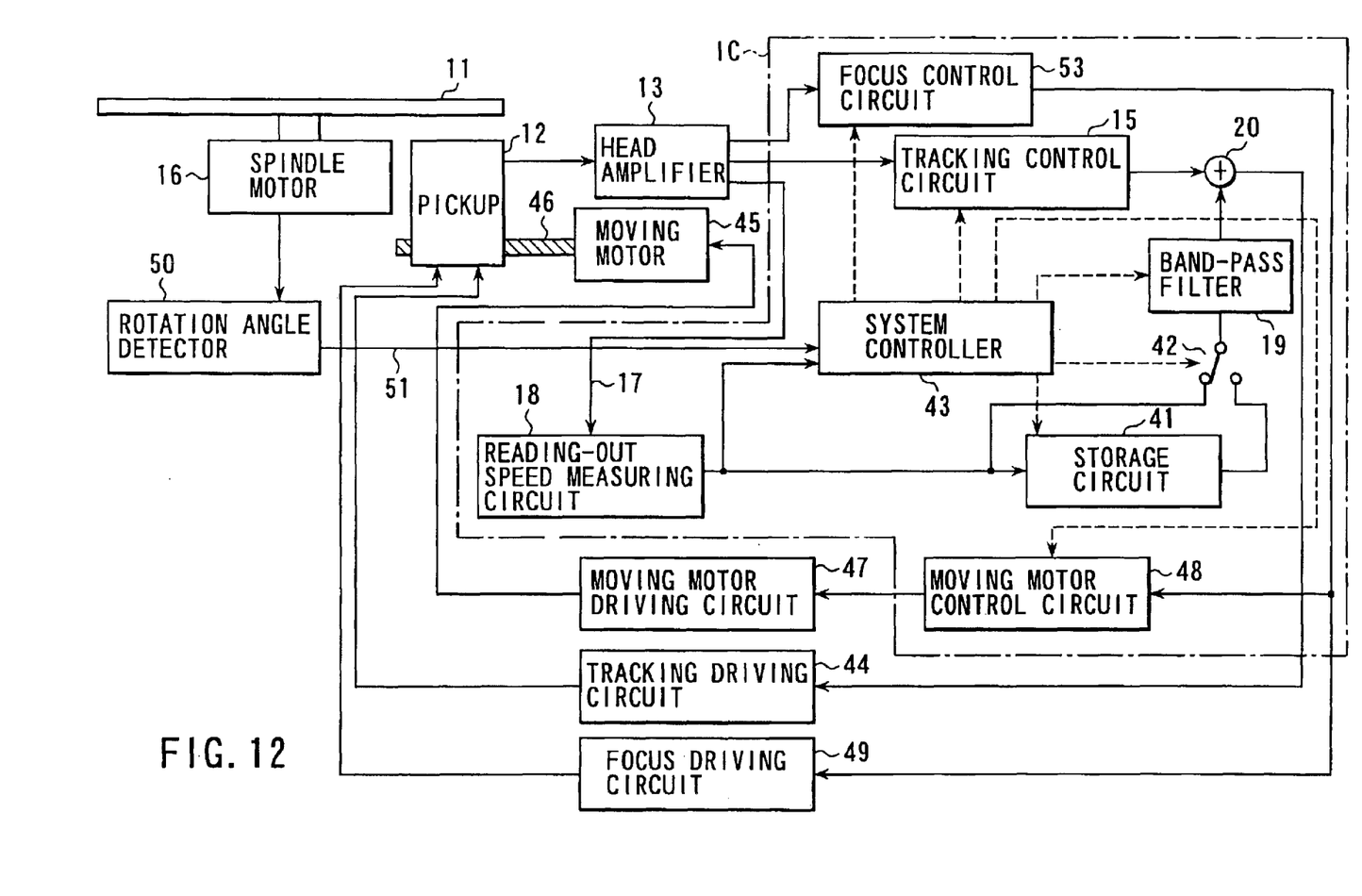
FIG. 12 is a block diagram showing a modified embodiment of the optical disk reproducing apparatus shown in FIG. 7.

FIG. 12 shows a modified embodiment of the optical disk reproducing apparatus shown in FIG. 7.

In the optical disk reproducing apparatus shown in FIG. 12, unlike the optical disk reproducing apparatus mentioned above with reference to FIG. 7, the connecting position between the storage circuit 41 and the selecting circuit 42 is changed to a position between the reading-out speed detecting circuit 18 and the band-pass filter 19, and storing and selecting operations are performed at a stage of the output (the reading-out speed signal) of the reading-out speed detecting circuit 18 instead of the output (the eccentricity signal of a disk rotation) of the band-pass filter 19.

Accordingly, in either case, the output of the selecting circuit 42 is the output of the reading-out speed detecting circuit 18, and only the eccentricity component is extracted in the band-pass filter 19 to be supplied to the correcting circuit 20. All of the other portions of the modified embodiment are the same as the embodiment shown in FIG. 7, and explanation thereof is omitted.

Even when the invention is configured in this manner, substantially the same effect as that in the optical disk reproducing apparatus of FIG. 7 can be obtained according to the operations similar to those in the optical disk reproducing apparatus mentioned above with reference to FIG. 7.

Furthermore, the present invention is not limited to the above embodiments, and it can be implemented in various modified manner within the scope and spirit of the invention.

For example, regarding the structure where the optical disk 11 is rotated and reproduced at a constant linear speed by the spindle motor 16, the present invention may be structured such that the rotation speed of the spindle motor 16 is controlled on the basis of the information signal output form the head amplifier 13, and the eccentricity signal showing the amount of eccentricity of the disk rotation is generated from change in rotation speed of the spindle motor 16 to be added to the feedback loop of the tracking control.

Also, in the above, the optical disk reproducing apparatus of the type where laser light is reflected on a disk is explained as the example. However, like the above, the present invention is applicable to an optical disk reproducing apparatus of a type where information is read out when laser light is transmitted through a disk, of course.

As mentioned above, according to the optical disk reproducing apparatus of the present invention, an eccentricity signal can be obtained easily. Moreover, a tracking control performance to eccentricity can be improved using the eccentricity signal by not only performing control with the conventional tracking error signal but also using the eccentricity information of a disk rotation, and a reproducing performance at a high speed of a disk which is made largely eccentric during the disk rotation can be improved.

More precisely, the gain compensation and phase compensation of the tracking servo loop can be realized even in a high rotational speed range of the reproduced disk while maintaining a sufficient phase margin.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk reproducing apparatus comprising:

a signal extracting section configured to emit light on to a track of a disk having a track shape of concentric tracks or a spiral track on which information has been recorded during rotation of the disk, to extract the information by receiving the light which is reflected from the track or is passed through the track, to convert the information to an electric signal, and to output the electric signal;

an information signal generating circuit configured to generate a signal including the information which is recorded on the disk and a tracking error signal which shows a deviation of a relative position in the radial direction of the disk between the light which the signal extracting section emits and the track from the signal extracting section;

a tracking moving section configured to move the position of the light emitted from the signal extracting section in the radial direction of the disk;

a tracking control circuit configured to generate a tracking control signal in response to the tracking error signal such that the position of the emitted light from the signal extracting section is maintained on the track;

an eccentricity signal generating circuit configured to generate an eccentricity showing a position deviation between a center point of the track shape of the disk and a rotation center point of the disk on the basis of the output of the information signal generating circuit; and a tracking correcting circuit configured to substantially add the output of the eccentricity signal generating circuit to the output of the tracking control circuit to drive and control the tracking moving section on the basis of the added output;

wherein the eccentricity signal generating circuit comprises:

a reading-out speed detecting circuit configured to detect the reading-out speed of the information from the output of the information signal generating circuit, and a band-pass filter configured to extract the component which is near the rotation frequency of the disk within the range of the change in the reading-out speed of the information from the output of the reading-out speed detecting circuit to output the eccentricity signal.

2. An optical disk reproducing apparatus according to claim 1, wherein the eccentricity signal generating circuit comprises:

a storage circuit to which the output of the band-pass filter is input and which stores the output of the band-pass filter at least during one rotation of the disk; and a selecting circuit to which the output of the band-pass filter is input as a first input and the output of the storage circuit is input as a second input and which outputs one of the inputs selectively;

wherein the tracking correcting circuit adds the selected output of the selecting circuit to the output of the tracking control circuit.

3. An optical disk reproducing apparatus according to claim 1, wherein the eccentricity signal generating circuit comprises:

a storage circuit to which the output of the reading-out speed detecting circuit is input and which stores the output of the reading-out speed detecting circuit at least during one rotation of the disk, and a selecting circuit to which the output of the reading-out speed detecting section is input as a first input and the output of the storage circuit is input as a second input, and which outputs one of these inputs selectively to send the same to the band-pass filter.

4. An optical disk reproducing apparatus according to claim 2, wherein the selecting circuit selects the first input during reading-out of the information from the disk, and selects the second input while the tracking control performed by the tracking control circuit is put in an off state or while the tracking control performed by the tracking control circuit is turned off and the position of the emitted light of the signal extracting section is being moved by the tracking moving section.

5. An optical disk reproducing apparatus according to claim 3, wherein the selecting circuit selects the first input during reading-out of the information from the disk, and selects the second input while the tracking control performed by the tracking control circuit is put in an off state or while the tracking control performed by the tracking control circuit is turned off and the position of the emitted light of the signal extracting section is being moved by the tracking moving section.

6. An optical disk reproducing apparatus according to claim 2, wherein the selecting circuit selects the first input when information is first read out from the disk, and selects the second input which is the output of the storage circuit after the input signal corresponding to at least one rotation of the disk is stored in the storage circuit.

7. An optical disk reproducing apparatus according to claim 3, wherein the selecting circuit selects the first input when information is first read out from the disk, and selects the second input which is the output of the storage circuit after the input signal corresponding to at least one rotation of the disk is stored in the storage circuit.

8. An optical disk reproducing apparatus according to claim 2, further comprising a rotation angle detector configured to output a pulse signal for each approximately constant rotation angle in synchronism with rotation of the disk, wherein, when the storage circuit stores the input signal corresponding to at least one rotation of the disk, the storage circuit stores the same in synchronism with the output pulse signal of the rotation angle detector, and when the storage circuit outputs the stored signal, the storage circuit outputs the same in synchronism with the output pulse signal of the rotation angle detector.

9. An optical disk reproducing apparatus according to claim 3, further comprising a rotation angle detector configured to output a pulse signal for each approximately constant rotation angle in synchronism with rotation of the disk, wherein, when the storage circuit stores the input signal corresponding to at least one rotation of the disk, the storage circuit stores the same in synchronism with the output pulse signal of the rotation angle detector, and when the storage circuit outputs the stored signal, the storage circuit outputs the same in synchronism with the output pulse signal of the rotation angle detector.

10. An optical disk reproducing apparatus according to claim 4, further comprising a rotation angle detector configured to output a pulse signal for each approximately constant rotation angle in synchronism with rotation of the disk, wherein, when the storage circuit stores the input signal corresponding to at least one rotation of the disk, the storage circuit stores the same in synchronism with the output pulse signal of the rotation angle detector, and when the storage circuit outputs the stored signal, the storage circuit outputs the same in synchronism with the output pulse signal of the rotation angle detector.

11. An optical disk reproducing apparatus according to claim 5, further comprising a rotation angle detector configured to output a pulse signal for each approximately constant rotation angle in synchronism with rotation of the disk, wherein, when the storage circuit stores the input signal corresponding to at least one rotation of the disk, the storage circuit stores the same in synchronism with the output pulse signal of the rotation angle detector, and when the storage circuit outputs the stored signal, the storage circuit outputs the same in synchronism with the output pulse signal of the rotation angle detector.

12. An optical disk reproducing apparatus according to claim 6, further comprising a rotation angle detector configured to output a pulse signal for each approximately constant rotation angle in synchronism with rotation of the disk, wherein, when the storage circuit stores the input signal corresponding to at least one rotation of the disk, the storage circuit stores the same in synchronism with the output pulse signal of the rotation angle detector, and when the storage circuit outputs the stored signal, the storage circuit outputs the same in synchronism with the output pulse signal of the rotation angle detector.

13. An optical disk reproducing apparatus according to claim 7, further comprising a rotation angle detector configured to output a pulse signal for each approximately constant rotation angle in synchronism with rotation of the disk, wherein, when the storage circuit stores the input signal corresponding to at least one rotation of the disk, the storage circuit stores the same in synchronism with the output pulse signal of the rotation angle detector, and when the storage circuit outputs the stored signal, the storage circuit outputs the same in synchronism with the output pulse signal of the rotation angle detector.

14. An optical disk reproducing apparatus according to claim 1, wherein the reading-out speed detecting section measures the frequency of synchronization signals which are recorded on the disk at constant intervals in advance.

15. An optical disk reproducing apparatus according to claim 2, wherein the reading-out speed detecting section measures the frequency of synchronization signals which are recorded on the disk at constant intervals in advance.

16. An optical disk reproducing apparatus according to claim 1, further comprising:
  a voltage controlled oscillating circuit whose oscillating frequency varies according to at least one control voltage,
  a phase comparing circuit configured to compare the phases of the output of the voltage control oscillating circuit the signal including the information which is recorded on the disk for generation performed by the information signal generating circuit with each other to output the phase error as an electric signal, and
  a phase locked loop circuit which comprises a filter circuit configured to remove unnecessary frequency components from the output of the phase comparing circuit to generate the control voltage of the voltage control oscillating circuit and which generates a clock synchronized with the signal including the information which is recorded on the disk for generation performed by the information signal generating circuit, wherein
  the phase locked loop circuit is used as the reading-out speed detecting circuit, and the control voltage of the voltage control oscillating circuit which is generated by the filter circuit is output to the band-pass filter.

17. An optical disk reproducing apparatus according to claim 2, further comprising:
  a voltage controlled oscillating circuit whose oscillating frequency varies according to at least one control voltage,
  a phase comparing circuit configured to compare the phases of the output of the voltage control oscillating circuit the signal including the information which is recorded on the disk for generation performed by the information signal generating circuit with each other to output the phase error as an electric signal, and
  a phase locked loop circuit which comprises a filter circuit for removing unnecessary frequency components from the output of the phase comparing circuit to generate the control voltage of the voltage control oscillating circuit and which generates a clock synchronized with the signal including the information which is recorded on the disk for generation performed by the information signal generating circuit, wherein
  the phase locked loop circuit is used as the reading-out speed detecting circuit, and the control voltage of the voltage control oscillating circuit which is generated by the filter circuit is output to the band-pass filter.

18. An optical disk reproducing method comprising:
  extracting a reproduced signal from a track of a disk having a track shape of concentric tracks or a spiral track by emitting light on to the track during rotation of the disk and by receiving the light which is reflected from the track or passed through the track;
  generating, from the reproduced signal, an information signal recorded on the disk and a tracking error signal representing a deviation of a relative position in the radial direction of the disk between the incident light and the track;
  moving an incident position of the emitted light on the track in the radial direction of the disk to perform tracking control;
  generating an eccentricity signal denoting a deviation between a center of the track shape and a rotation center of the disk on the basis of the information signal; and
  adding the eccentricity signal and the tracking error signal for obtaining an added signal to correct the tracking position of the incident light on the basis of the added signal;
  wherein the eccentricity signal generating comprises:
  detecting the reading-out speed of the information from the information signal, and
  extracting the frequency component which is near the rotation frequency of the disk within the range of the change in the reading-out speed of the information from the detected reading-out speed to output the eccentricity signal.

19. An optical disk reproducing method according to claim 18, further comprising the steps of:
  storing the eccentricity signal at least during one rotation of the disk;
  selecting one of the generated eccentricity signal and the stored eccentricity signal; and
  performing the tracking control on the basis of the selected one of the eccentricity signals.

20. An integrated circuit device for use in an optical disk reproducing apparatus in which a light is emitted from a pickup to a target position of a track on a disk having a track shape of concentric tracks or a spiral track on which information has been recorded, wherein the target position of the track is moved in a radial direction on the disk by a tracking moving section during rotation of the disk, and a received light signal is obtained based on the light reflected from the track or passed through the track to read out an information signal from the received light signal, the device comprising:
  a tracking control circuit configured to generate a tracking control signal in response to a tracking error signal obtained based on the received light signal and denoting a relative deviation between a position of an emitted light and the track in the radial direction of the disk such that the position of the emitted light is maintained on the track;
  an eccentricity signal generating circuit configured to generate an eccentricity denoting a deviation between a center point of the track shape on the disk and a rotation center point of the disk based on the information signal; and
  a tracking correction circuit configured to substantially add the output of the eccentricity signal generating circuit to the output of the tracking control circuit to drive and control the tracking moving section based on the added output;
  wherein the eccentricity signal generating circuit comprises:
  a read-out speed detecting circuit configured to detect a read-out speed of the information signal; and
  a band-pass filter configured to extract a component which is near a rotation frequency of disk from read-out speed variation components contained in an output of the read-out speed detecting circuit.

* * * * *